United States Patent Office

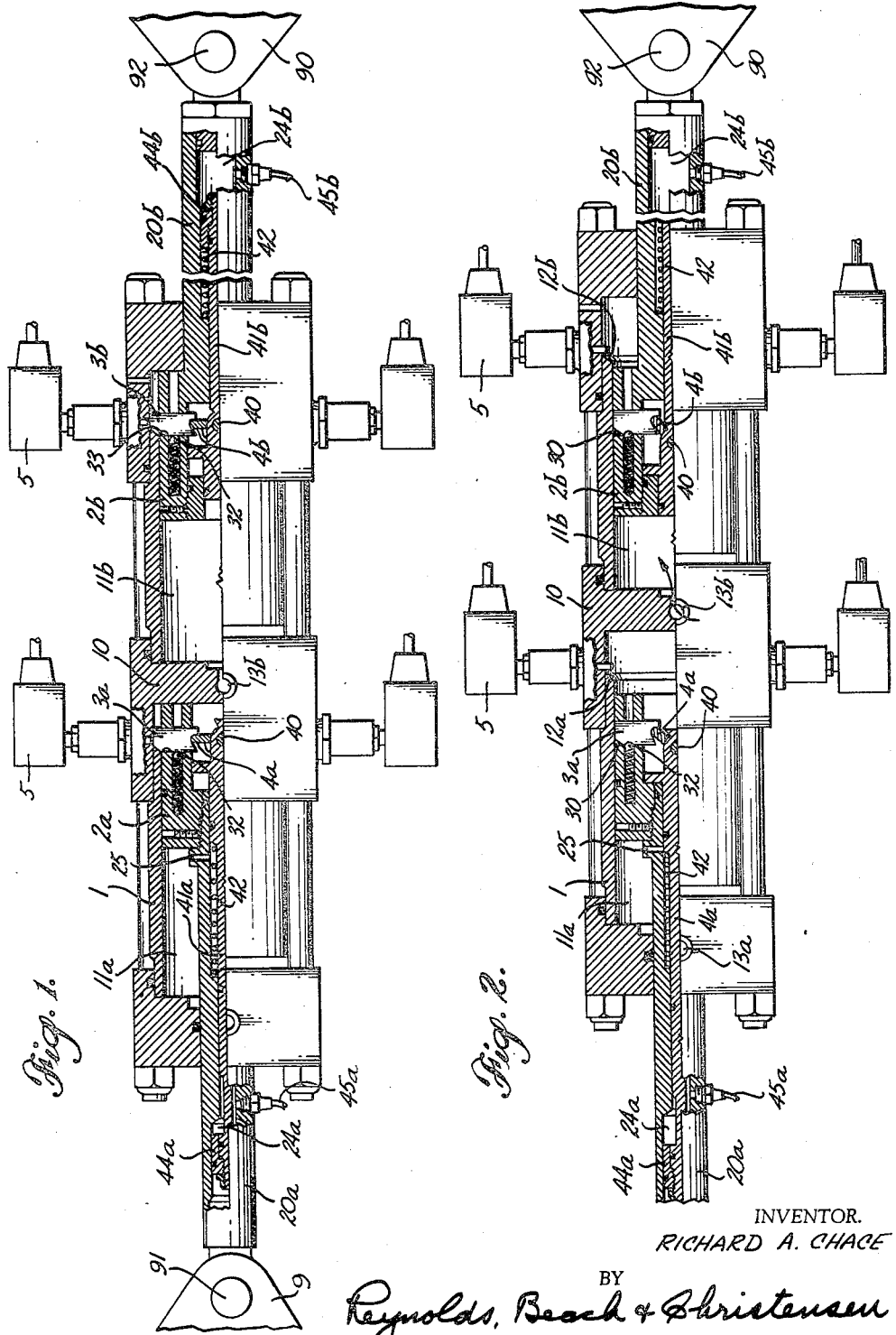

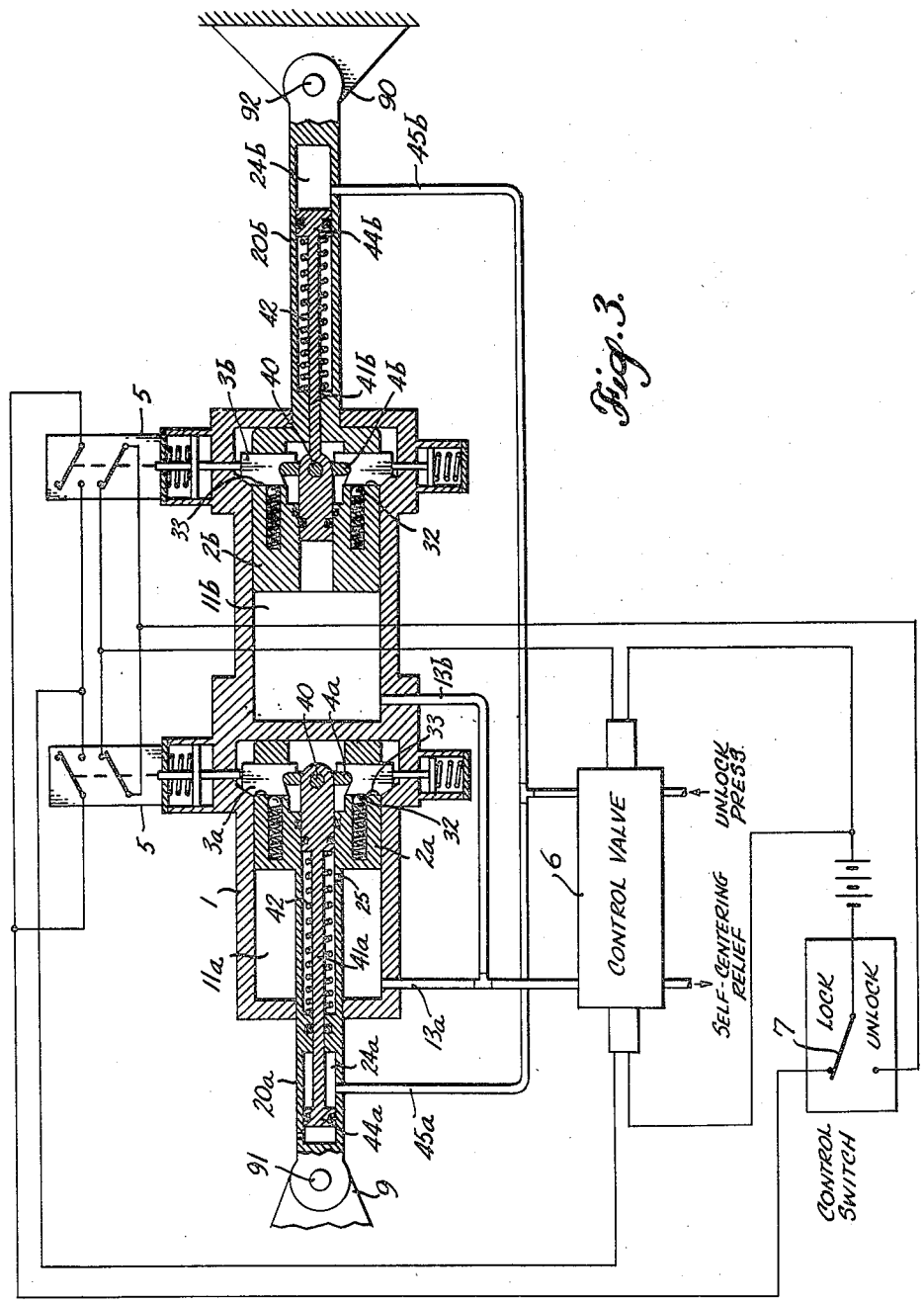

2,949,890
Patented Aug. 23, 1960

2,949,890

SELF-CENTERING MID-STROKE SECURING DEVICE

Richard A. Chace, Bellevue, Wash., assignor to Tog-Loc, Inc., Bellevue, Wash., a corporation of Washington Filed Mar. 3, 1959, Ser. No. 796,943

10 Claims. (Cl. 121—40)

The present device, utilizing a toggle locking device similar to that in the Patent No. 2,744,501 dated May 8, 1956, to myself and George C. Newell, Jr., comprises a mechanical securing device such as might be employed to retain the control surface of an airplane, while groundborne, fixedly in a neutral position, but which can be released hydraulically and held released before and during flight, so that the control surface may respond to its control devices, and which will center itself and relock in its neutral position by reapplication of locking hydraulic pressure when the need for response of the control surface to its normal control devices has passed. For example, a vertical rudder should be positively locked and held in the general plane of its fin so long as the airplane is groundborne and not maneuvering. The securing device of this invention will do this, without reliance on hydraulic pressure to retain it secured, nor other such force. When use of the rudder is imminent, application of hydraulic pressure to the toggle locking device will unlock it, allowing the rudder to move freely under the influence of its normal controls to either side of its neutral position, throughout its proper range of movement. The application of pressure need be only momentary, and a retainer device assists in maintaining it in unlocked position, without the necessity for continued application of hydraulic pressure. The locking device would normally continue to be pressurized, however, and thus would maintain the locking device unlocked. The rudder responds to its separate controls in the usual manner. When relocking is required, reverse application of hydraulic pressure equalizes pressures within the securing device and positively returns all parts to their neutral position. This same reverse pressure acts upon the toggle locking device, and when the parts reach midstroke or neutral position the toggle locking device effects reengagement of locking dogs, which without further application of hydraulic pressure retain all parts in this position. Movement of the parts into locked position can be arranged to deenergize the hydraulic system, entire reliance being now placed on the mechanical securing device. The general objects of this invention appear above, and other objects will become more clearly apparent as this specification proceeds.

The form of the invention in the drawings is chosen as illustrative, and is not to be taken as restrictive. For example, the invention can be incorporated in a form more nearly like that shown in the Bakke Patent No. 2,764,132 dated September 25, 1956.

Figure 1 is a half axial section, and half elevation, of the securing device according to this invention, with parts in the secured or neutral position.

Figure 2 is a view similar to Figure 1, with parts in the free-floating condition.

Figure 3 is a diagrammatic axial sectional view, with the hydraulic and electric systems associated therewith, parts being in positions corresponding to Figure 1.

The device shown herein is intended to secure a fitting 9 which might be fixed upon some structural part of an airplane and a fitting 90 which may be movable with control movement of a rudder, for example, in the illustrative case mentioned above, so that they will be immovable relative to one another when the airplane is groundborne and the rudder is not required for maneuvering, but which will be freely releasable and kept released so that the rudder, connected in the assumed instance to the fitting 90, may move freely under the influence of its normal controls, which are not shown. The present device is a securing device and not an actuator to effect movement of the rudder.

The device includes a cylindrical casing 1 centrally divided by a partition 10 to define chambers 11a and 11b at its opposite ends. Within the respective chambers there are slidable sealed pistons 2a and 2b, which are wholly unconnected. A piston rod or stem 20a protrudes through the end of the cylinder 11a which is distant from the central partition 10 for connection at 91 to the fitting 9, and a similar rod or stem 20b protrudes through the opposite end of the cylindrical housing 1 for connection at 92 to the fitting 9.

Considering the composite element 20a, 1 and 20b as a unit, it will be clear that so long as all three are locked together the distance between the connections at 91 and 92 is unvarying. Toggle devices are employed for so locking the parts together. Thus the dogs 3a and 3b, usually arranged in pairs, are acted upon by the respective toggle links or levers 4a and 4b, each pivoted at 40 in a slide 41a or 41b, each of which is axially movable within a bore in its stem 20a and 20b, respectively. Springs 42 at all times urge the respective slides to the right as viewed in the drawings, and the effect of this, if the dogs 3a and 3b are free to move, is to rotate the toggle links 4a and 4b outwardly into alignment with the locking dogs and to project the latter outwardly into locking positions. However, when the toggle links are rotated into the positions shown in Figure 2, the corresponding dogs are free to retract inwardly, clearing the inner wall of the respective chambers 11a and 11b within which their pistons slide. Axial movement is preferably effected in accordance with the principles of the Chace and Newell patent mentioned above, by interaction between the beveled surface 30 at the tip of the locking dogs and correspondingly beveled shoulders 12a and 12b within the bore of the respective chambers. When the dogs are retracted, then, the pistons are free to move axially with respect to the cylindrical casing 1.

Preferably, detent means are provided which alone or in conjunction with pressure in one or the other of the chambers 11a or 11b retains the dogs thus retracted, these detent means consisting for example of spring-pressed balls 32 engaging within corresponding recesses 33 in the dogs.

Each slide 41a or 41b is formed as or incorporates a piston, as for example the piston 44a sliding within a small cylinder 24a in the stem 20a, and the piston 44b movable within the cylinder 24b in the stem 20b.

Pressure fluid may be supplied at 45a and 45b to these cylinders 24a and 24b by a line which is common to both such ports, whereby, when pressure fluid is supplied to the interior of the cylinders 24a and 24b, the pistons 44a and 44b are moved to the left, in opposition to the springs 42, and this reacts directly upon the slides and so upon the pivot pin 40 of the toggle links to swing them inwardly in the direction that will permit radially inward retraction of the dogs 3a and 3b. The detents 30 will tend to hold the dogs in this retracted position, and axial retraction is effected by the interaction of the beveled surfaces 30 with the correspondingly beveled shoulders 12a and 12b.

When parts are thus released, there is no longer any positive connection between the fittings 9 and 90. The respective pistons 2a and 2b may move within their cylinders 11a and 11b to the full extent of the stroke permitted by the length of these cylinders, and such movement will continue until some positive action is taken to relock their parts in their initial position. Such relocking is effected by the supply of pressure fluid through the ports 13a and 13b, which are connected in common, to the left hand end of the respective chambers 11a and 11b. When pressure fluid is thus admitted, each piston 2a and 2b is moved to the right, or in effect the cylinder 1 floats to the left, and when the parts reach the extreme right limit of their movement and the pistons bottom, the pressure is then applied to the ends of the slides 41a and 51b to urge them to the right and so to swing the toggle links 4a and 4b into alignment with their respective dogs. Pressure fluid is admitted behind the slide 41a by way of the port 25. This final application of pressure overcomes the rather slight force of the detents 30 and, the parts having reached their initial position, are immediately relocked and so held in secured position until unlocking is again accomplished positively in the manner first stated above, by application of pressure through the ports 45a and 45b.

Electric switches 5 are provided with actuating tips in position to be contacted by the tip of the dogs when the latter are projected into their locking position. Engagement and movement of these tips of the electric switches deenergizes the hydraulic current in the manner shown in Figure 3.

The alternative application of pressure to release and to relock is controlled by a control valve 6, the details of which are immaterial, it being merely a valve to supply pressure alternatively to the ports or lines 45a and 45b, or to the ports 13a and 13b. Control of the position of the valve 6 may be accomplished by means of a locking and unlocking switch 7 in the electrical system.

Although reference has been made to projection outwardly of the dogs for locking, it is a simple reversal to mount the dogs on the cylinder 1 and to project them inwardly to engage locking shoulders on the guided elements, such as the pistons or their equivalent, and such changes in form are within the intended scope of this invention, unless the context clearly indicates a contrary intent.

This invention in certain respects resembles that of a companion case, Serial No. 796,833, filed March 3, 1959, although the two are specifically different. Certain claimed subject-matter herein is generic to the common inventive concept.

I claim as my invention:

1. A securing device of the character described comprising a housing centrally partitioned to define two separate cylinders, a piston reciprocable in each cylinder, a rod projecting from each piston through the respectively opposite ends of the housing, for connection to two members which in use move relatively; one element of each piston and its cylinder having a locking shoulder, locking dog means guided in the other such element for radial projective and retractive movement into and from engagement with said shoulder, a slide mounted in the dog-mounting element for movement therewith and for limited axial movement relative thereto, toggle devices engaging each dog means, and operatively connected to said slide for movement by the slide into alignment with the dog means to project the latter into locking position, or from such alignment for retraction of the dog means, means operatively connected to both slides and acting on both thereof simultaneously to move them in the direction to retract the dog means, for unrestricted relative movement of the piston rods and their respective connected members, and means to supply pressure fluid simultaneously to one side of each piston, to urge the latter in the direction for reengagement of the dog means and their locking shoulders, to secure the piston rods and their connected members against relative movement, and means active upon each slide to move the same in the direction to project the dog means upon registering with its shoulder.

2. A securing device as set forth in claim 1, including restraining means for engaging the dog means, when retracted, to restrain projective movement thereof during normal relative movement of the piston rods, even though the dog means come into registry with their shoulders, and means to apply fluid pressure from the cylinders to the respective slides, to overcome such restraining means and effect projective movement of the dog means.

3. A securing device as in claim 2, including a hydraulic system incorporating a control valve for application of pressure to the cylinders for locking, or relief thereof to unlock.

4. A securing device as in claim 3, including electrical control means to move said control valve into its respective positions, and switch means positioned for engagement by the dog means when projected into locking position, and operatively connected to said control means to neutralize the hydraulic system upon such movement of the dog means.

5. A securing device as set forth in claim 1, wherein each slide is formed as a piston slidable within a bore in its piston and rod assembly, and exposed to the pressure when supplied within the cylinder, detents engageable with the several dog means to restrain projective movement thereof during normal relative movement of the piston rods and their connected members, said slides upon application of fluid pressure, with the dog means in registry with their shoulders, overcoming said detents for projective movement of the dog means into locking position.

6. A securing device as in claim 1, wherein the locking shoulders and the shoulder-engaging portions of the dog means are complementary beveled for disengagement and retractive movement, after retractive movement of the toggle devices, under the influence of a force between the pistons and their cylinders in the axial direction.

7. A securing device as in claim 1, wherein the respective cylinders are internally shouldered, and the complemental dog means, toggle devices, and slides are mounted in the corresponding pistons.

8. A centering mid-stroke securing device comprising two aligned and oppositely directed piston and piston rod assemblies, a housing formed with two separate cylinders wherein the respective assemblies are slidably fitted, means to supply a pressure fluid to the corresponding end of each cylinder, to shift the pistons both in the same direction relative to its cylinder, means interengageable between each such assembly and its cylinder to secure the parts in such shifted position, a plunger axially shiftably received within each assembly, and exposed to the pressure fluid in the corresponding assembly, to be shifted thereby in a given sense, said plunger being operatively connected to the corresponding securing means to urge the latter into secured position upon application of such pressure, and means to supply pressure fluid alternatively to the opposite side of each plunger, to shift the same axially in the opposite sense to release its securing means.

9. A securing device as in claim 8, and detent means engageable with the securing means to retain the latter in its released position until its plunger is subjected to cylinder pressure for movement of parts into secured position.

10. A securing device of the character described comprising a housing including a cylinder and a relatively axially shiftable assembly including a piston reciprocable within said cylinder, means including a shoulder formed within the cylinder and a dog carried by and shiftable with the piston for projective movement into engagement with said shoulder and for retractive unlocking movement, means to supply pressure fluid within the housing for application to the piston, to effect relative axial movement therebetween in opposite senses, the piston being bored and a plunger being reciprocable within said bore, and exposed at one end to pressure within the cylinder, to urge the plunger in an unlocking sense, yieldable means urging the plunger in the opposite sense, toggle links carried by the plunger for rotation under the influence of the plunger's respective movement in a retractive and in a projective sense, said toggle links being operatively connected to the dogs to project the latter when in registry with the shoulder upon projective movement of the toggle links, or to free the dogs for retractive movement upon retractive movement of the toggle links, the piston effecting registry between the dogs and the shoulder upon simultaneous application of opposing pressures to the piston, and detent means engageable with the dogs to retain them in retracted position until application of pressure to the exposed end of the plunger.

References Cited in the file of this patent
UNITED STATES PATENTS

| | | |
|---|---|---|
| 1,842,776 | Bogoslowsky | Jan. 26, 1932 |
| 2,685,275 | Caldwell | Aug. 3, 1954 |
| 2,744,501 | Chace et al. | May 8, 1956 |
| 2,764,132 | Bakke | Sept. 25, 1956 |